(12) United States Patent
Namuduri et al.

(10) Patent No.: US 8,606,447 B2
(45) Date of Patent: Dec. 10, 2013

(54) METHOD AND APPARATUS TO OPERATE A POWERTRAIN SYSTEM INCLUDING AN ELECTRIC MACHINE HAVING A DISCONNECTED HIGH-VOLTAGE BATTERY

(75) Inventors: Chandra S. Namuduri, Troy, MI (US); Suresh Gopalakrishnan, Farmington Hills, MI (US); Keith D. Van Maanen, Birmingham, MI (US); Bryan M. Ludwig, West Bloomfield, MI (US); Bon Ho Bae, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 172 days.

(21) Appl. No.: 13/113,306

(22) Filed: May 23, 2011

(65) Prior Publication Data

US 2012/0303189 A1 Nov. 29, 2012

(51) Int. Cl.
*B60L 11/00* (2006.01)
*B60L 11/04* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| | | | |
|---|---|---|---|
| 4,803,472 A | 2/1989 | Murari et al. | |
| 5,373,195 A * | 12/1994 | De Doncker et al. | 307/45 |
| 5,796,175 A * | 8/1998 | Itoh et al. | 307/10.1 |
| 5,991,182 A | 11/1999 | Novac et al. | |
| 6,239,582 B1 | 5/2001 | Buzan et al. | |
| 6,271,712 B1 | 8/2001 | Ball | |
| 6,275,093 B1 | 8/2001 | Shehawat et al. | |
| 6,747,880 B2 | 6/2004 | Grover | |
| 6,978,854 B1 * | 12/2005 | Kuang et al. | 180/65.235 |
| 7,015,561 B2 | 3/2006 | Saxelby et al. | |
| 7,084,609 B2 | 8/2006 | Pillote et al. | |
| 7,116,080 B2 | 10/2006 | Chen | |
| 7,199,636 B2 | 4/2007 | Oswald et al. | |
| 7,227,340 B2 | 6/2007 | Chen | |
| 7,271,570 B2 | 9/2007 | O'Gorman et al. | |
| 7,292,445 B2 | 11/2007 | Linke | |
| 7,436,080 B2 * | 10/2008 | Hackl et al. | 290/40 C |
| 7,961,449 B2 * | 6/2011 | Kaster et al. | 361/160 |
| 8,020,650 B2 * | 9/2011 | Van Maanen et al. | 180/65.265 |
| 8,064,227 B2 * | 11/2011 | Namuduri et al. | 363/17 |
| 8,140,205 B2 * | 3/2012 | Hanyu et al. | 701/22 |
| 8,314,578 B2 * | 11/2012 | Namuduri et al. | 318/400.3 |
| 2008/0284385 A1 | 11/2008 | Namuduri et al. | |
| 2010/0060245 A1 | 3/2010 | Namuduri et al. | |
| 2010/0225258 A1 | 9/2010 | Namuduri et al. | |
| 2010/0236851 A1 | 9/2010 | VanMaanen et al. | |
| 2011/0050174 A1 * | 3/2011 | King et al. | 320/134 |
| 2011/0101774 A1 * | 5/2011 | Wagner | 307/10.1 |
| 2011/0144842 A1 * | 6/2011 | Ni et al. | 701/22 |

OTHER PUBLICATIONS

Finco, S., et al. High Performance NMOS Active Zener and Rectifier Diodes, IEEE 2001.

* cited by examiner

*Primary Examiner* — Mary Cheung
*Assistant Examiner* — Michael Berns

(57) ABSTRACT

A powertrain system includes an electric motor/generator unit. Upon detecting an open high-voltage switch associated with a high-voltage DC electrical bus, low-voltage electrical power is employed to energize the high-voltage DC electrical bus, control parameters are adjusted to operate the electric motor/generator unit in a fault tolerant electric generation mode, an internal combustion engine is operated to spin the electric motor/generator unit, and the electric motor/generator unit is operated in the fault tolerant electric generation mode.

20 Claims, 5 Drawing Sheets

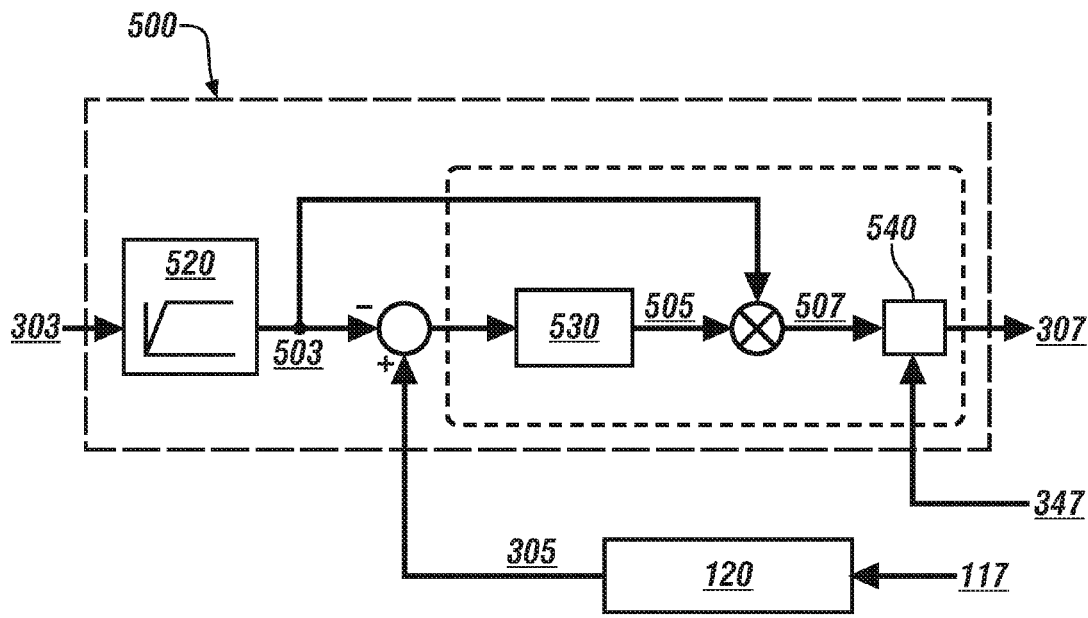
*FIG. 5*
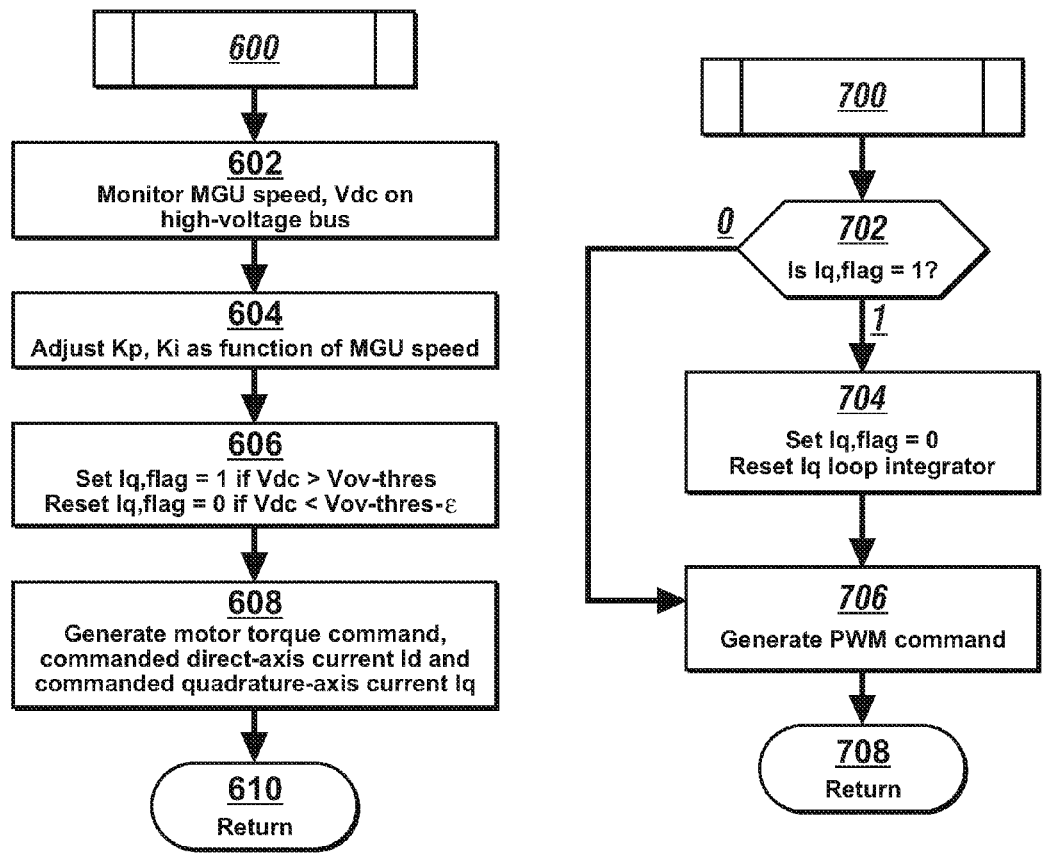
*FIG. 6*            *FIG. 7*

METHOD AND APPARATUS TO OPERATE A POWERTRAIN SYSTEM INCLUDING AN ELECTRIC MACHINE HAVING A DISCONNECTED HIGH-VOLTAGE BATTERY

TECHNICAL FIELD

This disclosure relates to electrical power flow in a hybrid electric vehicle.

BACKGROUND

The statements in this section merely provide background information related to the present disclosure. Accordingly, such statements are not intended to constitute an admission of prior art.

Vehicles having hybrid powertrain systems selectively use different energy sources to generate torque and power to achieve optimal fuel efficiency in response to operator commands. This includes selectively employing an internal combustion engine and a motor/generator unit(s) connected to a high-voltage battery module or energy storage system for propulsion and operational control. One hybrid powertrain includes an engine stop/start system wherein the engine automatically stops during ongoing vehicle operation and automatically restarts using an electric motor/generator unit. The system preferably includes a regenerative braking system for recharging the high-voltage energy storage system via the electric motor/generator unit and the ability to selectively shut down the engine during vehicle idle, referred to as an autostop control scheme.

Known motor/generator units may be used in belt-alternator-starter (BAS) systems in place of alternators. The BAS system applies torque to a serpentine belt of the engine when an operator signals an intention to resume travel after executing an autostop control scheme. Torque from the motor/generator unit(s) may be used to crank the engine. During cold starting of the engine, a crankshaft-mounted auxiliary or 12-volt starter motor may provide cranking torque to crank the engine. Known BAS systems use a high-voltage energy storage system supplying high-voltage electrical power through a voltage inverter to the motor/generator unit(s). The high-voltage battery may be temporarily disconnected or otherwise rendered unavailable due to a fault or other operating conditions. This may result in a loss of or an insufficient field excitation, especially for an asynchronous machine-based electric motor/generator unit, which in turn may result in a loss of sustained auxiliary electrical power generation. Insufficient auxiliary electrical power may result in a vehicle shutdown leading to a walk-home event.

SUMMARY

A powertrain system includes an electric motor/generator unit. Upon detecting an open high-voltage switch associated with a high-voltage DC electrical bus, low-voltage electrical power is employed to energize the high-voltage DC electrical bus, control parameters are adjusted to operate the electric motor/generator unit in a fault tolerant electric generation mode, an internal combustion engine is operated to spin the electric motor/generator unit, and the electric motor/generator unit is operated in the fault tolerant electric generation mode.

BRIEF DESCRIPTION OF THE DRAWINGS

One or more embodiments will now be described, by way of example, with reference to the accompanying drawings, in which:

FIG. 5 illustrates a DC-link voltage regulation loop, which is a dynamically-adjustable proportional-integral controller that has speed-adjustable gains in accordance with the disclosure;

FIG. 6 illustrates an outer loop control scheme in flowchart form to generate input parameters for elements of the control system described with reference to FIG. 3 for controlling operation of the propulsion system described with reference to FIGS. 1 and 2 in accordance with the disclosure; and FIG. 7 illustrates an inner loop control scheme in flowchart form to generate input parameters for elements of the control system described with reference to FIG. 3 for controlling operation of the propulsion system described with reference to FIGS. 1 and 2 in accordance with the disclosure.

DETAILED DESCRIPTION

Figure 1:
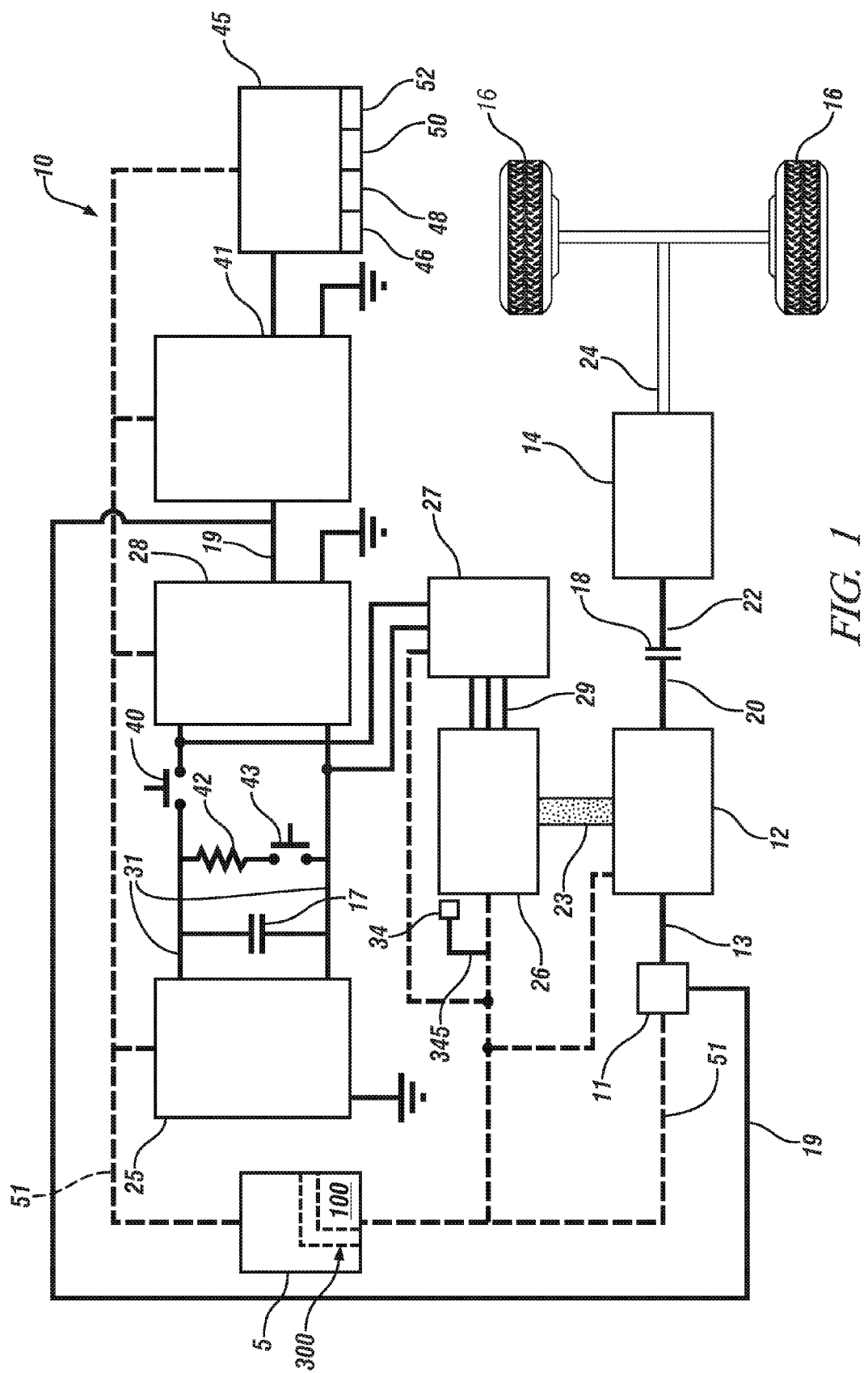
FIG. 1 illustrates a vehicle including a propulsion system including an internal combustion engine rotatably coupled to an electric motor/generator unit in accordance with the present disclosure.

Referring now to the drawings, wherein the showings are for the purpose of illustrating certain exemplary embodiments only and not for the purpose of limiting the same, FIG. 1 schematically illustrates a propulsion system 10 for a vehicle. The propulsion system 10 includes a powertrain system including an internal combustion engine 12 rotatably coupled to an electric motor/generator unit (MGU) 26 and a transmission 14 that are coupled to a driveline including road wheels 16. The transmission 14 is configured to transfer tractive torque to the road wheels 16 in response to control signals originating from a control module 5. The internal combustion engine 12 generates torque that is transferred to the transmission 14. The MGU 26 is configured to transfer torque to the engine 12. The MGU 26 is configured to react torque originating in the engine 12 to generate electric power during a regenerative period. This includes a transfer of tractive torque from the road wheels 16 through the transmission 14 and the engine 12 to the MGU 26 in a regenerative braking operation. In one embodiment, the MGU 26 may be configured to transfer torque through the engine 12 to the transmission 14 as tractive torque to effect a vehicle launch. Like reference numerals correspond to like or similar components in the several drawings.

The internal combustion engine 12 is mechanically rotatably coupled to the MGU 26 via a belt drive system 23 including a serpentine belt or another suitable coupling mechanism. In one embodiment, the belt drive system 23 includes the serpentine belt routed between a pulley attached to a crankshaft 13 of the engine 12 and another pulley attached to a rotating shaft coupled to a rotor of the MGU 26. The aforementioned elements form a belt-alternator-starter (BAS) system. The BAS system effects autostop and autostart operations during ongoing operation of the vehicle.

Preferably, the engine 12 is a multi-cylinder internal combustion engine selectively operative in a plurality of states during ongoing operation of the vehicle, including one of an engine-on state and an engine-off state. The engine-on and engine-off states are achieved using an autostart control scheme and an autostop control scheme, respectively. During ongoing operation of the vehicle, the control module 5 may control the engine 12 to the engine-off state using the autostop control scheme in response to operator commands, e.g., no depression of an accelerator pedal and vehicle operating conditions that include an engine idle that may occur in response to a vehicle stop condition at a traffic light. It is appreciated that other operating conditions may result in the engine 12 operating at idle. In this manner, the vehicle may reduce fuel consumption. Subsequently, the control module 5 may control the engine 12 to the engine-on state using the autostart control scheme to provide tractive torque for vehicle propulsion in response to an operator command, e.g., depression of an accelerator pedal. By way of definition, an engine-on state is an engine operating state whereat the engine 12 is fueled and fired and is producing sufficient torque to maintain engine operation at or above a combustion stability limit, and an engine-off state is an engine operating state whereat the engine 12 is unfueled and unfired and is not rotating and not generating torque. Other engine states may include one of an all-cylinder state and a cylinder deactivation state, and one of a fueled state and a fuel cutoff state. In one embodiment, the engine 12 is a spark-ignition engine with timing of combustion controlled by advancing or retarding spark ignition timing. Alternatively, the engine 12 is a compression-ignition engine with timing of combustion controlled by advancing or retarding timing of fuel injection events. It is appreciated that the engine 12 may be configured to operate in several combustion modes including spark-ignition and homogeneous charge combustion modes.

The engine 12 includes an auxiliary starter motor 11 that may be selectively connected through a gear set to the crankshaft 13 of the engine 12, and configured to provide cranking torque to crank the engine 12 in response to a start command associated with an operator key-on command. The auxiliary starter motor 11 is preferably powered with low-voltage electrical power obtained from an auxiliary battery 41 electrically connected thereto. The crankshaft 13 of the engine 12 couples to a rotatable output member 20 that couples to an input member 22 of the transmission 14. In one embodiment, the output member 20 of the engine 12 couples to the input member 22 of the transmission 14 via a torque transfer mechanism 18, which may include a clutch device, a hydrodynamic torque converter, or another suitable mechanism. The transmission 14 may be a multi-speed step transmission, an electrically-variable transmission, or any other suitable transmission design capable of transferring tractive torque between the transmission 14 and the driveline including the road wheels 16 via an output member 24.

The MGU 26 preferably includes a multiphase induction or asynchronous AC machine including a stator and a rotor magnetically coupled to the stator. As depicted, the MGU 26 is a three-phase machine. It is appreciated that the MGU 26 may include any one of a plurality of multiphase devices, e.g., two-phase, four-phase, five-phase, and six-phase electric machines. The rotor of the MGU 26 is preferably coupled to the belt drive system 23, which is configured to transfer torque between the MGU 26 and the engine 12. A rotational sensor 34 is suitably arranged to monitor rotational position and speed of the rotor of the MGU 26 for feedback and control purposes. Preferably the rotational sensor 34 is a resolver that generates an output signal (345) that indicates an angle and a rotational speed of the rotor of the MGU 26.

A power inverter module 27 electrically connects to a high-voltage energy storage system 25 via a high-voltage DC power bus 31 that includes a positive high-voltage DC power bus and a negative high-voltage DC power bus. The high-voltage energy storage system 25 electrically connects to positive and negative sides of the high-voltage DC power bus 31, with a high-voltage switch 40 positioned in such a way as to disconnect the high-voltage energy storage system 25 from one or both the positive and negative sides of the high-voltage DC power bus 31, e.g., in response to a system fault. The high-voltage switch 40 is illustrated in an open position, but is in a closed position during ongoing operation. The power inverter module 27 and associated control circuits and schemes may convert direct current (DC) electric power originating from the high-voltage energy storage system 25 to alternating current (AC) electric power that is transferred to the MGU 26 to generate torque. The power inverter module 27 may convert AC electric power generated by the MGU 26 to DC electric power to electrically charge the high-voltage energy storage system 25 and the auxiliary battery 41 via an auxiliary power module (APM) 28 when magnetizing current sufficiently magnetizes the stator.

The APM 28 electrically connects to the high-voltage energy storage system 25 via the high-voltage DC power bus 31. The APM 28 electrically connects to the auxiliary battery 41 via the low-voltage DC power bus 19. The auxiliary battery 41 is preferably a low-voltage energy storage device, such as a 12V DC battery, and is suitable for providing electric power to the starter motor 11 and other accessories and auxiliary systems 45 aboard the vehicle, including, e.g., headlights and interior lights 46, a radio or audio system 48, power seats 50, and an electric power steering system 52. The APM 28 may be configured as a DC-DC power converter that converts DC electric power from a high-voltage level to a low-voltage level, and vice versa, the operation of which is controlled by the control module 5. The APM 28 is preferably configured as a DC-DC power converter that only converts DC electric power from a high-voltage level to a low-voltage level to minimize cost. That is, the APM 28 converts power at high voltage originating in the high-voltage energy storage system 25 to low voltage power suitable for charging the auxiliary battery 41 and/or directly powering one or more of the auxiliary systems 45 as needed. The control module 5 controls power flow aboard the vehicle from the high-voltage energy storage system 25 and auxiliary battery 41 to provide the required electrical functionality.

The control module 5 is preferably configured with a distributed architecture that includes a plurality of remotely located controllers that execute all required power flow control functionality aboard the vehicle in response to commands originating from a control scheme. It is appreciated that the functions described as being performed by the control module 5 may be combined into one or more devices, e.g., implemented in software, hardware, and/or application-specific integrated circuitry (ASIC) and ancillary circuits that may be separate and distinct from the control module 5. The control module 5 preferably includes one or various combinations of one or more of general-purpose digital controllers, each including a microprocessor or central processing unit, storage mediums including read only memory (ROM), random access memory (RAM), electrically programmable read only memory (EPROM), a high speed clock, analog-to-digital (A/D) and digital-to-analog (D/A) circuitry, and input/output circuitry and devices (I/O) and appropriate signal conditioning and buffer circuitry. The control module 5 includes a control system 300 including an executable control scheme 100 that is in the form of algorithms, resident program instructions and calibrations stored in one of the storage mediums and executed to provide the respective functions.

The control module 5 signally and operatively connects to each of the engine 12, the starter motor 11, the MGU 26, the high-voltage energy storage system 25, the APM 28, the power inverter module 27, and the auxiliary battery 41 preferably via a communications bus 51. It is appreciated that information transfer to and from the control module 5 may be accomplished by one or more communications paths, including using a direct connection, using a local area network bus and using a serial peripheral interface bus.

When the engine 12 includes the MGU 26 and is configured as a BAS system, the power inverter module 27 may selectively control the MGU 26 to rotate the belt drive system 23 to crank the engine 12. Furthermore, the power inverter module 27 may selectively control the MGU 26 to operate as a generator to recharge the high-voltage energy storage system 25 via power transfer from the engine 12 and the transmission 14. This may include, for example, capturing energy transferred from the wheels 16 through the transmission 14 and the engine 12 to the MGU 26 during a regenerative braking event. The starter motor 11 may be controlled to draw electrical power from the low-voltage auxiliary battery 41 for cranking and starting the engine 12 as needed, such as during an initial start-up of the vehicle in response to a key-on event and in response to high-voltage electrical fault as described herein below.

Figure 2:
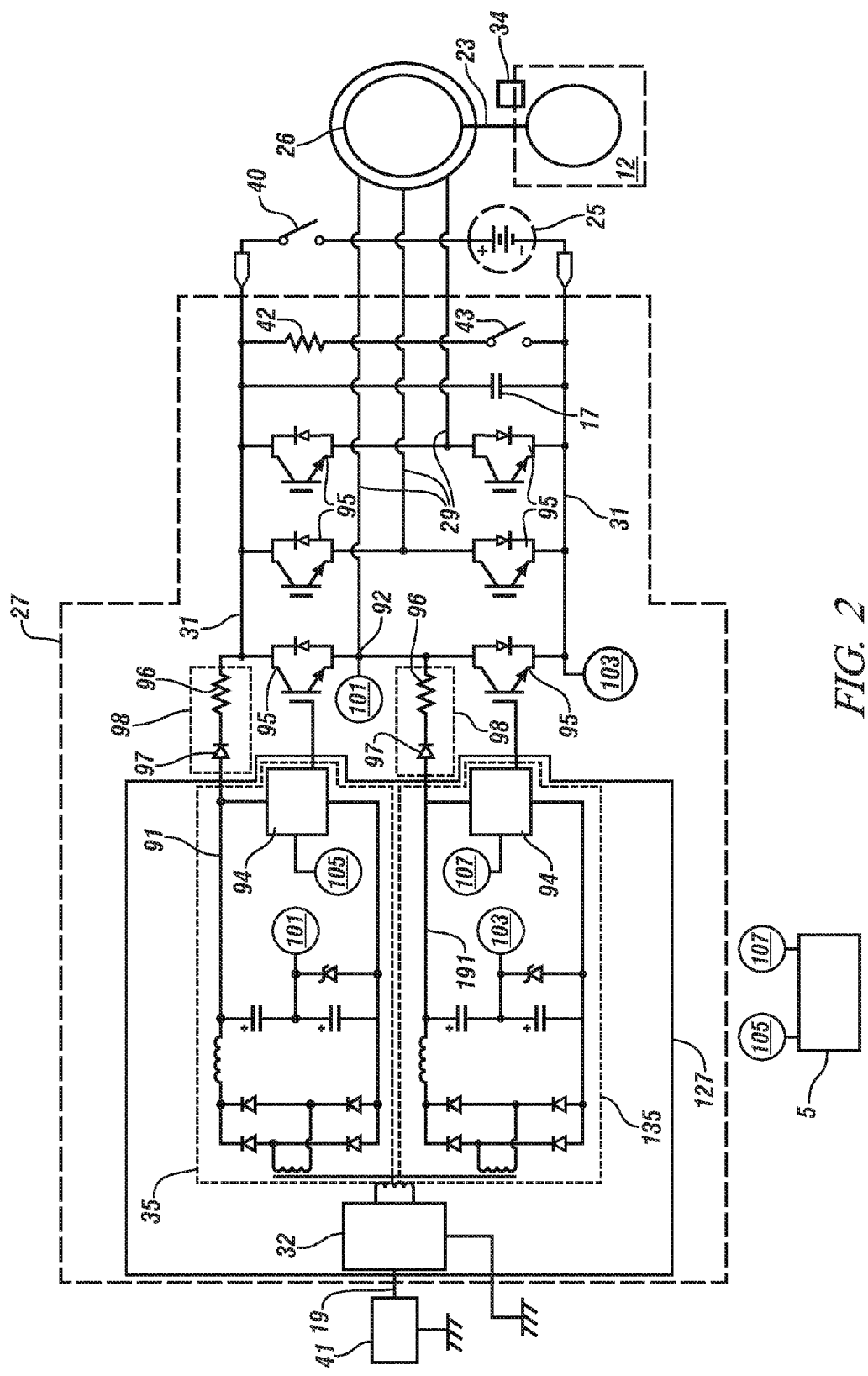
FIG. 2 illustrates an electrical power circuit associated with an electric motor/generator unit, the electrical power circuit including an auxiliary battery, power inverter module, and the electric motor/generator unit coupled to the internal combustion engine in accordance with the disclosure.

FIG. 2 schematically shows details of an electrical power circuit associated with an electric motor/generator unit, e.g., the MGU 26 of FIG. 1, including the auxiliary battery 41, the power inverter module 27 including a gate drive module 127, and the MGU 26 coupled to the engine 12 via the belt drive system 23. Elements 101, 103, 105, and 107 indicate connections within the electrical power circuit and are not physical elements. The high-voltage energy storage system 25 electrically connects to the positive and negative sides of the high-voltage DC power bus 31. A gate drive module 127 includes an AC power oscillator 32 electrically connected to the auxiliary battery 41 via the LV bus 19. The AC power oscillator 32 electrically interacts with elements of upper and lower gate drive bias power supplies 35 and 135, respectively to transform and rectify electric power originating in the auxiliary battery 41 to provide DC electric power to multiple pairs of gate drive circuits 94.

A signal output from each of the gate drive circuits 94 electrically connects to a base of one of a pair of the switch devices 95 of the power inverter module 27. A pair of the gate drive circuits 94 and an associated pair of the switch devices 95 corresponding to a single phase (e.g., phase A) of the MGU 26 are shown. During ongoing operation, each gate drive circuit 94 associated with one of the switch devices 95 generates a pulse in response to a control signal originating from the control module 5, which activates the switch device 95 and induces current flow through one of the phases of the MGU 26. It is appreciated that there is an analogous gate drive module including upper and lower gate drive bias power supplies and corresponding pair of switching devices 95 associated with each of the phases of the MGU 26. It is appreciated that there is a gate drive circuit 94 associated with each switch device 95.

The power inverter module 27 electrically connects to each of the phases of the MGU 26. The power inverter module 27 includes a plurality of the switch devices 95, shown as three pairs of the switch devices 95 associated with corresponding phases of the MGU 26 when the MGU 26 is a three-phase device. Each of the switch devices 95 corresponds to one of the gate drive circuits 94 of the gate drive module 127.

The MGU 26 electrically connects to the power inverter module 27 as shown, and mechanically couples to the engine 12 via the belt drive system 23. One or more high-voltage DC link capacitor(s) 17 is positioned across the positive and negative sides of the high-voltage DC power bus 31. In one embodiment the DC link capacitor(s) 17 have a 3000 μF capacitance. The DC link capacitor(s) 17 are suitable to maintain electrical potential across the high-voltage DC power bus 31, but lack capacity to fully substitute for the high-voltage energy storage system 25 over an extended period of time without ongoing charging. There is an optional active DC bus discharge circuit including a resistor 42 and a switch 43.

Each switch device 95 preferably includes a semi-conductor device having low-on impedance, e.g., in an order of magnitude of milli-Ohms. One exemplary switch device includes a field-effect transistor device. In one embodiment this may be a MOSFET device. Alternatively, the switch devices 95 may include IGBT devices, JFET devices and other devices. The switch devices 95 are configured as pairs to control electric power flow between the positive side of the high-voltage bus 31 and one of the electric cables connected to and associated with one of the phases of the MGU 26 and the negative side of the high-voltage bus 31. The control module 5 includes a switch control circuit to control activation and deactivation of each of the switch devices 95 via the gate drive circuits 94.

Gate drive pre-charge circuits 98 are serially connected between the gate drive module 127 and the high-voltage bus 31 and switch devices 95 of the power inverter module 27. More specifically, each phase of the power inverter module 27 includes a first one of the gate drive pre-charge circuits 98 serially connected between a high-voltage side 91 of the upper gate drive bias power supply 35 and the positive side of the high-voltage bus 31, and a second one of the gate drive pre-charge circuits 98 serially connected between a high-voltage side 191 of the lower gate drive bias power supply 135 and an electric node 92 defined by a junction point between the associated pair of the switch devices 95 that electrically connect to one phase of the MGU 26.

Each gate drive pre-charge circuit 98 includes a diode 97 connected in series to a resistive device 96. Each diode 97 is preferably biased to permit current originating at the auxiliary battery 41 to flow via the LV bus 19 through the gate drive module 127 to the high-voltage bus 31 and the capacitor 17 within the power inverter module 27. Each diode 97 is preferably biased to restrict current flow from the high-voltage bus 31 to the gate drive module 127.

When a fault is detected in the high-voltage circuit, e.g., a ground isolation fault, the high-voltage switch 40 is controlled to disconnect the high-voltage energy storage system 25 from one or both the positive and negative sides of the high-voltage DC power bus 31. The control module 5 discontinues activating and deactivating all the switch devices 95 via the gate drive circuits 94. The gate drive pre-charge circuits 98 are configured to permit the gate drive module 127 to use electric power originating from the auxiliary battery 41 to electrically charge the DC link capacitor(s) 17, as described with reference to FIG. 4. Thus, when the high-voltage energy storage system 25 is disconnected from the charging circuit by opening of the high-voltage switch 40, the gate drive pre-charge circuits 98 function to charge the DC link capacitor(s) 17 using low-voltage electric power originating from the auxiliary battery 41. In one embodiment, when the auxiliary battery 41 is a nominal 12 V DC device, each of the upper and lower gate drive bias power supplies 35 and 135 may generate a voltage output applied to the pre-charge circuits 98 that may range between 15V and 25V. When the pre-charge circuits 98 are connected to the power inverter module 27 as described hereinabove and the high-voltage switch 40 is open, thus removing the high-voltage energy storage system 25 from the circuit, electric power passes through the pre-charge circuits 98 and charges the DC link capacitor(s) 17. As configured, the gate drive pre-charge circuits 98 combine to generate a bias voltage across the DC link capacitor(s) 17 that is sufficient to provide enough magnetizing energy to the MGU 26 when the engine 12 is operating at idle, and in one embodiment, may total at least 34V. Thus, the DC link capacitor(s) 17 is pre-charged to have sufficient electrical energy at a voltage that is greater than required to magnetize and otherwise operate the stator of the MGU 26, which in one embodiment is a voltage that is greater than a required voltage of 32V. Details associated with such operation are described with reference to FIGS. 3 and 4.

Figure 3:
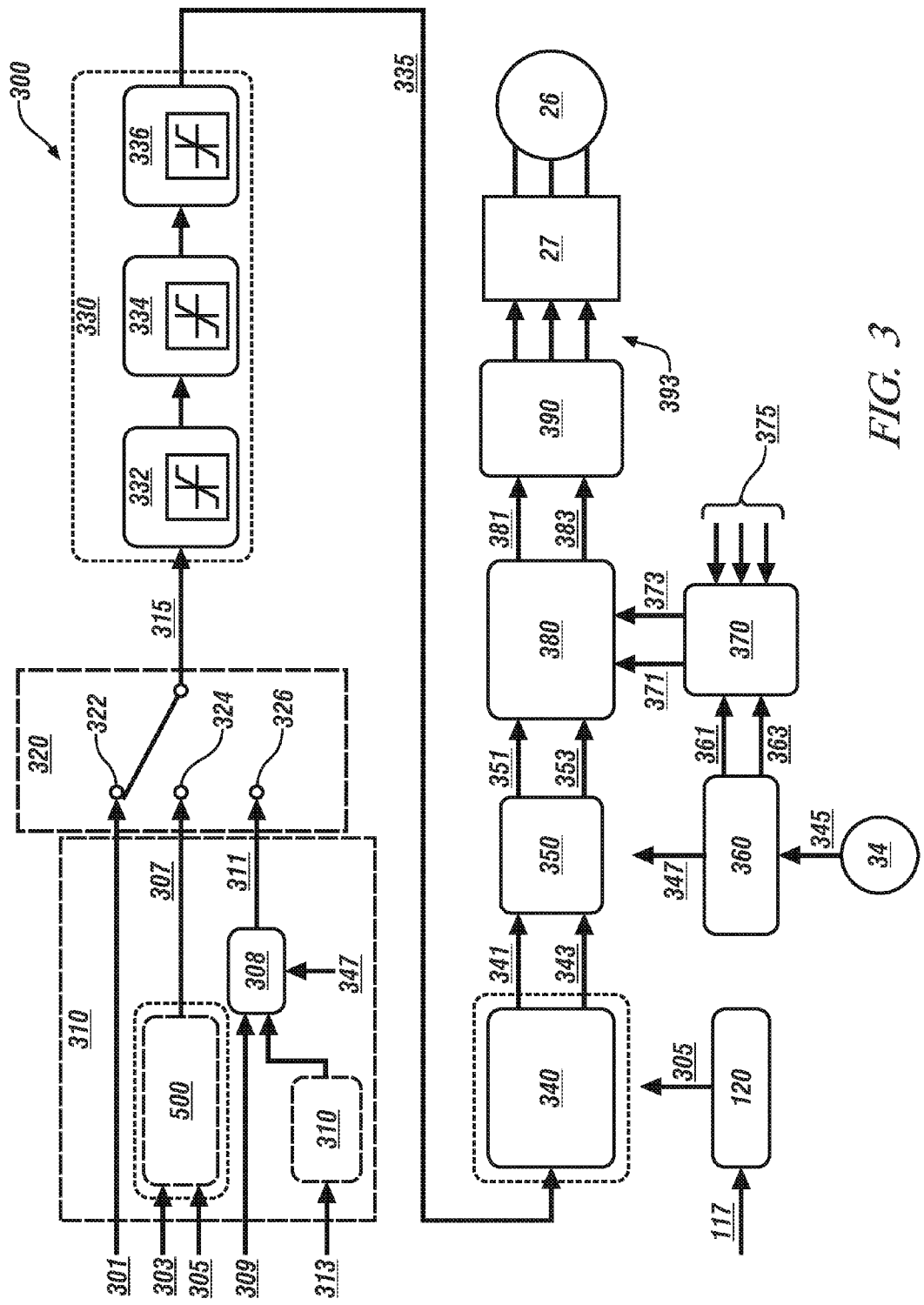
FIG. 3 illustrates a control system in a block diagram configuration for controlling electric power flow to an electric motor/generator unit in accordance with the disclosure.

FIG. 3 schematically shows a control system 300 in a block diagram configuration for controlling electric power flow to the MGU 26 using the electrical power circuit described with reference to FIG. 2. Each of the elements of the control system 300 is a task that is periodically executed to effect an outcome, as will be described. The elements include a torque command determination block 310, a mode selection block 320, a torque command limitation block 330, a motor current determination block 340, a load dump protection control block 350, a speed observer and flux angle/load torque observer 360, a current input block 370, and a motor current control block 380. The motor current control block 380 signally connects to a pulsewidth modulation block 390 that is signally connected to the power inverter module 27 that couples to the MGU 26. It is appreciated that the aforementioned blocks and associated tasks of the control scheme 300 may be executed using suitable hardware, algorithms, and calibrations to monitor the respective input parameters and achieve the desired output parameters.

The torque command determination block 310, mode selection block 320, and torque command limitation block 330 are used to determine a motor torque command referred to as a slewed torque command (335). The torque command determination block 310 determines torque commands including a motor torque command (301), a regenerative torque command (307) used in conjunction with operation in the fault tolerant electric generation mode 324, and a speed-related torque command (311). The motor torque command (301) is a command for the MGU 26 to generate torque during ongoing operation in response to an operator torque request. The regenerative torque command (307) is determined in response to a commanded voltage across the high-voltage DC bus (303) and a monitored voltage across the high-voltage DC bus Vdc (305), and is determined using a DC-link voltage regulation loop 500, as described with reference to FIG. 5. The commanded voltage across the high-voltage DC bus (303) and the monitored voltage across the high-voltage DC bus Vdc (305) are related to the voltage across the high-voltage DC power bus 31 between the positive high-voltage DC power bus and the negative high-voltage DC power bus, or the bias voltage across the high-voltage DC link capacitor(s) 17. The commanded speed (309) is a command for the MGU 26 to generate a rotational speed output during ongoing operation. The commanded speed (309) or a preferred speed profile (313) from a speed profile generator 310 may be compared to a measured rotational speed (347). A speed regulator 308 compares the commanded speed (309) or the preferred speed profile (313) from the profile generator 310 and the measured rotational speed (347) to determine a speed-related torque command (311) that is responsive to the commanded speed (309) or the preferred speed profile (313) and accounts for the capability of the system.

The mode selection block 320 selects one of a voltage regeneration mode 322 with the associated motor torque command (301), the fault tolerant electric generation mode 324 with the associated regenerative torque command (307), and a speed control mode 326 with the associated speed-related torque command (311) to determine a preferred torque command (315). The voltage regeneration mode 322 is selected and the motor torque command (301) is selected as the preferred torque command (315) when operating conditions indicate there is no fault in the system and the high-voltage switch 40 is intact, i.e., closed. The speed control mode 326 is selected and the speed-related torque command (311) is selected as the preferred torque command (315) when the system is operating to control speed of the MGU 26. The fault tolerant electric generation mode 324 is selected and the regenerative torque command (307) is selected as the preferred torque command (315) when there is a command to operate the MGU 26 in an electric power generation mode to charge the high-voltage energy storage system 25 and when there is a fault in the system that results in the high-voltage switch 40 being opened. The fault tolerant electric generation mode 324 is executed by the control module 5 to control operation of the powertrain system in response to a fault that results in the high-voltage switch 40 disconnecting the energy storage system 25 from the high-voltage DC power bus 31.

The torque command limitation block 330 imposes limitations on the preferred torque command (315), including a first torque limiter 332 associated with torque generating capability of the MGU 26. A second torque limiter 334 is associated with closed-loop power control. A third torque limiter 336 is associated with closed-loop voltage control. Operation of the aforementioned torque limiters 332, 334, and 336 of the torque command limitation block 330 are affected when the high-voltage switch 40 is opened and the system is operating in the fault tolerant electric generation mode 324 to effect electric power generation. The preferred torque command (315) is modified by the torque command limitation block 330 by imposing maximum and minimum torque states and a time-rate change in the torque resulting in the slewed torque command (335). The slewed torque command (335) is a commanded motor torque that is used to control the MGU 26.

In either of the voltage regeneration mode 322 and the speed control mode 326, the first torque limiter 332 is set at a maximum torque capacity of the MGU 26 under the operating conditions. In the fault tolerant electric generation mode 324, the first torque limiter 332 is set to have the maximum positive commanded torque output from the MGU 26 equal to zero. Thus the MGU 26 operates to generate electric power, but does not generate torque in this mode.

In either of the voltage regeneration mode 322 and the speed control mode 326, the second and third torque limiters 334 and 336 are set at power and voltage control limits that account for the capacity of the high-voltage energy storage system 25 to maintain voltage and provide electric power to generate torque with the MGU 26. In the fault tolerant electric generation mode 324, the second and third torque limiters 334 and 336 are set at power and voltage control limits that account for the capacity of the high-voltage DC link capacitor(s) 17 to maintain voltage and provide electric power to operate the MGU 26 to generate electric power.

The motor current determination block 340 determines a commanded direct-axis current Id (341) and a commanded quadrature-axis current Iq (343) for controlling the MGU 26 in response to the slewed torque command (335) using a direct-quadrature transformation with accommodation for speed-based machine flux. The motor current determination block 340 takes into account the monitored voltage across the high-voltage DC bus Vdc (305), which is preferably determined based upon a raw measurement of voltage (117) on the high-voltage bus 31 that has been filtered using a known high-voltage DC bus voltage filter 120. The high-voltage DC bus voltage filter 120 is preferably a low pass filter having a cutoff frequency that is adjustable. The cutoff frequency associated with operating the MGU 26 when in the voltage regeneration mode 322 is substantially lower than the cutoff frequency associated with operating the MGU 26 when in the fault-tolerant electric generation mode 324 with voltage control. As is appreciated, the determination of the commanded direct-axis current Id (341) and the commanded quadrature-axis current Iq (343) vary in response to the high-voltage bus voltage, and are affected by whether operating in the voltage regeneration mode 322 or the fault-tolerant electric generation mode 324.

Controllable and adjustable parameters associated with the motor current determination block 340 that are affected by a change between operating in the voltage regeneration mode 322 and operating in the fault-tolerant electric generation mode 324 include a change in a maximum allowable time-rate change in commanded direct and quadrature-axis currents Id, Iq (341, 343) for controlling the MGU 26. The maximum allowable time-rate changes in commanded direct and quadrature-axis currents Id, Iq (341, 343) are increased when operating in the fault-tolerant electric generation mode 324.

The controllable and adjustable parameters associated with the motor current determination block 340 that are affected by the change between operating in the voltage regeneration mode 322 and operating in the fault-tolerant electric generation mode 324 include a maximum allowable machine flux, which is used to determine the magnitude of the commanded direct-axis current Id (341) and the commanded quadrature-axis current Iq (343). The maximum allowable machine flux is preferably reduced when operating in the fault-tolerant electric generation mode 324. In one embodiment, the commanded quadrature-axis current Iq (343) is set equal to zero when operating in the fault-tolerant electric generation mode 324. This is described with reference to FIG. 7.

The speed observer and flux angle/load torque observer 360 monitors the output signal (345) from the rotational sensor 34 and determines the rotational position and the rotational speed (347) of the rotor of the MGU 26 therefrom using suitable data analysis methods. A rotor flux angle (363) and associated rotor flux speed (361) may also be determined therefrom.

The load dump protection control block 350 constrains the commanded direct-axis current Id (341) and commanded quadrature-axis current Iq (343) in response to the monitored voltage across the high-voltage DC bus Vdc (305) and rotational speed of the rotor of the MGU 26 (347), generating a constrained direct-axis current Id (351) command and a constrained quadrature-axis current Iq (353) command, which are input to the motor current control block 380.

The current input block 370 monitors inputs including the rotor flux angle (363) and associated rotor flux speed (361) and measured feedback electric currents (375) from each of the phases of the electric machine 26 (e.g., measured currents for phases A, B, and C when the electric machine 26 is a three-phase machine). The current input block 370 translates the monitored inputs into monitored direct-axis current Id (371) and monitored quadrature-axis current Iq (373), which are input to the motor current control block 380 as feedback states.

The motor current control block 380 uses a synchronous frame current regulator to determine commanded direct and quadrature voltages Vd (381) and Vq (383), respectively, based upon differences between the constrained direct-axis current Id (351) and constrained quadrature-axis current Iq (353) commands and the corresponding monitored direct-axis current Id (371) and monitored quadrature-axis current Iq (373). The commanded direct and quadrature voltages Vd (381) and Vq (383), respectively, are inputs to the pulsewidth modulation block 390.

The pulsewidth modulation block 390 generates pulse-width duty cycle commands (393) for controlling the phases of the power inverter module 27 in response to the commanded direct and quadrature voltages Vd (381) and Vq (383).

Figure 4:
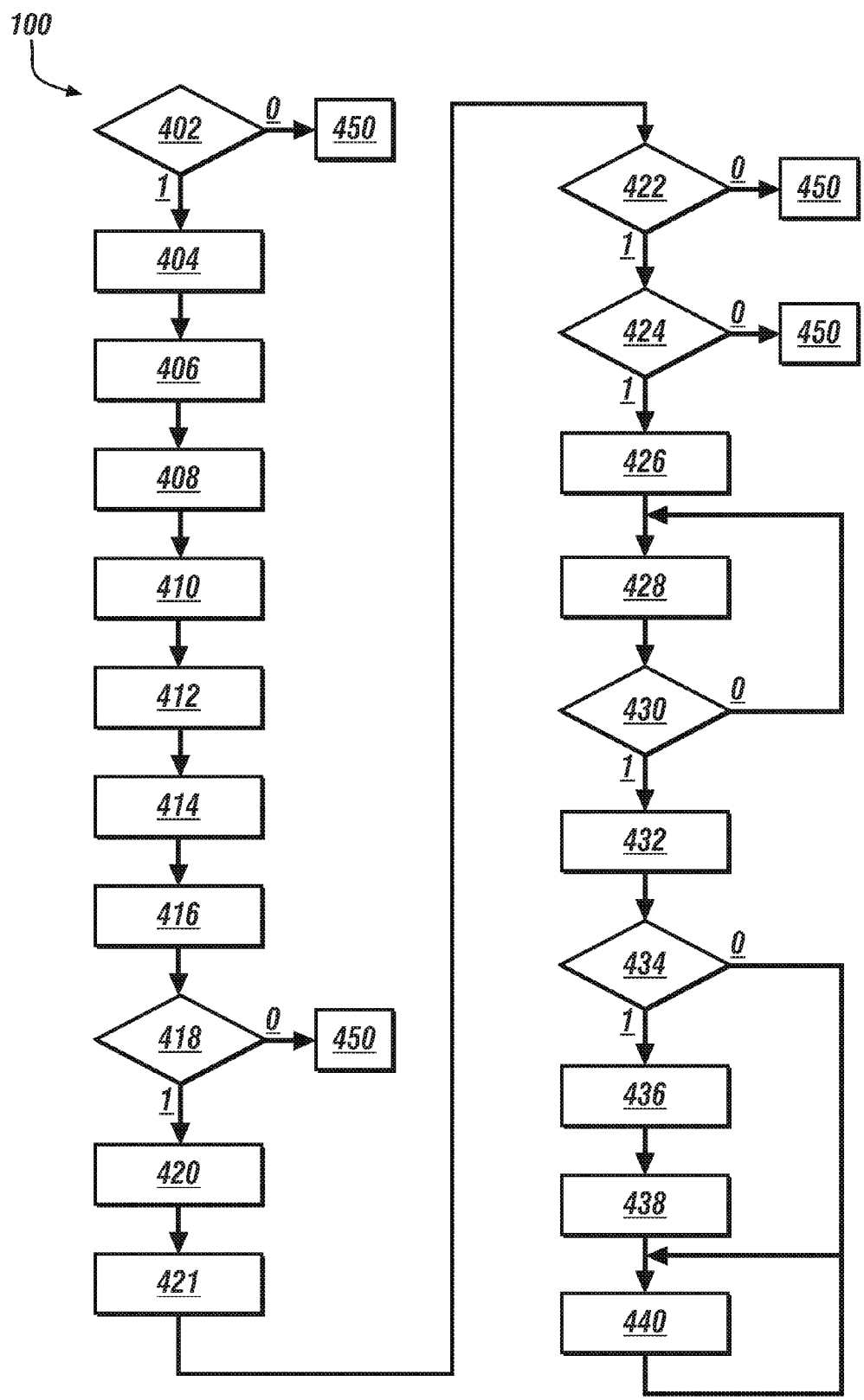
FIG. 4 illustrates a control scheme in flowchart form for controlling operation of the propulsion system described with reference to FIGS. 1 and 2 using the control system described with reference to FIG. 3 including controlling operation in response to a system fault in accordance with the disclosure.

FIG. 4 schematically shows control scheme 100, which is an element of the control system 300 for controlling operation of the propulsion system 10 described with reference to FIGS. 1 and 2 including controlling operation in response to a high-voltage electrical fault that causes the high-voltage switch 40 to disconnect the energy storage system 25 from the high-voltage DC power bus 31 with continuing operation in the fault-tolerant electric generation mode 324. The control scheme 100 operates to sustain auxiliary electrical power generation in the propulsion system 10 when a high-voltage electrical fault condition is detected, such as when the high-voltage energy storage system 25 is disconnected or offline, whether due to an electrical fault, attaining an end-of-life of the high-voltage energy storage system 25, system installation issues, or otherwise. The high-voltage switch 40 is preferably automatically opened in response to such a fault to remove the high-voltage energy storage system 25 from the circuit, with the open high-voltage switch 40 providing a suitable mechanism to diagnose that the high-voltage energy storage system 25 is disconnected. Depending upon the on/off operating state of the engine 12 when such a fault occurs, a limp-home mode including the fault-tolerant electric generation mode 324 may be automatically executed to permit continued operation of the propulsion system 10 to propel the vehicle. The particulars of the limp-home mode are selected depending upon the operating state of the engine 12 at the time a high-voltage electrical fault is detected.

The control scheme 100 is executed in the control module 5 relying upon the gate drive pre-charge circuits 98 shown in FIG. 2. The control scheme 100 provides sustained electric power flow in the fault-tolerant electric generation mode 324 upon detection or determination of a high-voltage electrical fault condition, e.g., when the high-voltage energy storage system 25 is offline, disconnected, or otherwise unavailable. This sustained electric power flow is achieved by pre-charging the DC link capacitor 17 to a minimum voltage and using the electric power as a source of magnetizing energy to the stator of the motor/generator unit 26 to enable voltage build-up when the motor/generator unit 26 is spun by the engine 12. The control module 5 is configured to operate in presence of a high-voltage electrical fault condition associated with the high-voltage energy storage system 25 and related elements. As such, the control module 5 controls voltage across the positive and negative sides of the high-voltage DC power bus 31 via the power inverter module 27, controls the APM 28 in a buck mode for recharging the auxiliary battery 41, and controls the power inverter module 27 in a pre-charge mode to charge the DC link capacitor(s) 17 between the positive and negative sides of the high-voltage DC power bus 31 to excite the stator of the MGU 26, permitting operating the motor/generator unit 26 to generate electric power in the fault-tolerant electric generation mode 324.

The control scheme 100 sustains operation of the motor/generator unit 26 using its low-voltage auxiliary power generation capability. The control scheme 100 uses isolated DC electric power available from the auxiliary battery 41 via the gate drive module 127 through the upper and lower gate drive bias power supplies 35 and 135 and the gate drive pre-charge circuits 98 to electrically charge the DC link capacitor(s) 17 to achieve a predetermined voltage across the positive and negative sides of the high-voltage DC power bus 31 sufficient to generate magnetizing energy in the stator windings of the MGU 26. Once the MGU 26 is spinning and magnetized, it is controlled by the power inverter module 27 to sustain the high-voltage bus voltage 31 at a voltage set-point that is substantially unchanged, and enables the APM 28 to supply electric power to support the low voltage electrical loads, e.g., those associated with the auxiliary systems 45.

Table 1 is provided as a key wherein the numerically labeled blocks and the corresponding functions for the control scheme 100 are set forth as follows.

TABLE 1

FIG. 4

| BLOCK | BLOCK CONTENTS |
|---|---|
| 402 | Is high-voltage battery fault detected? |
| 404 | Disable torque-generating control mode |
| 406 | Set MGU control state to inactive mode |
| 408 | Set inverter state = power stage disable |
| 410 | Set torque command = 0 |
| 412 | Set high-voltage switch open |
| 414 | Disable undervoltage lockout |
| 416 | Disable APM output state |
| 418 | Check if all other faults are clear |
| 420 | Set MGU control state to voltage control mode |
| 421 | If engine state = OFF, start engine |
| 422 | Is engine speed between Nmin and Nmax? |
| 424 | Is control state for operating the MGU a fault-tolerant electric generation mode? |
| 426 | Set control parameters for operating in the fault-tolerant electric generation mode |
| 428 | Enable pre-charge of high-voltage bus via the gate drive pre-charge circuits |
| 430 | Is Vdc > Vdc, min |
| 432 | Set inverter state = power_stage_enable |
| 434 | Is difference between Vdc_cmd and Vdc_measured less than threshold? |
| 436 | Enable Undervoltage lockout |
| 438 | Enable APM output state |
| 440 | Execute voltage control and current control loops and diagnostic tasks |
| 450 | End |

The control scheme 100 iteratively executes to monitor faults and detect whether a fault associated with the high-voltage energy storage system 25 has been detected (402). When such a fault is detected (1), a torque-generating control mode for operating the MGU 26 to generate torque is disabled (404) thereby disabling engine autostart via the MGU 26. Otherwise (0), operation of the present iteration of the control scheme 100 ends (450). A control state for operating the MGU 26 is set to an inactive mode (406), an inverter state is set to disable a power (torque) stage (408), and torque command for the MGU 26 is set to zero (410). The high-voltage energy storage system 25 is disconnected from the charging circuit, including opening the high-voltage switch 40 (412). Thus, the power output from the APM 28 and transistor gate control signals output from the control module 5 to the power inverter module 27 are initially disabled. An undervoltage lockout flag is disabled (414), which permits subsequent system operation even though the MGU 26 is initially deactivated and the voltage across the DC bus is lower than a preferred minimum voltage level associated with an expected autostart operation. The APM 28 is initially disabled (416) to prevent unintended electrical loading during a subsequent precharging of the high-voltage bus 31 using the gate drive module 127. The system verifies that there are no other faults that may preclude operating in a voltage control mode (418). When there are no related faults that preclude operating in the voltage control mode (1), the control state for operating the MGU 26 is set to enable a voltage control mode (420). One exemplary voltage control mode is the fault-tolerant electric generation mode 324 described herein. Otherwise (0), operation of the present iteration of the control scheme 100 ends (450).

The engine state is checked to determine whether the engine 12 is in the engine-on state or the engine-off state. If the engine is in the engine-off state, the engine 12 is autostarted using the auxiliary starter motor 11 to spin the engine 12 (421).

Engine speed is monitored and compared to a predetermined range, i.e., between a minimum speed Nmin and a maximum speed Nmax (422). When the engine speed is outside the predetermined range between the minimum speed Nmin and the maximum speed Nmax (0), operation of the present iteration of the control scheme 100 ends (450). When the engine speed is within the predetermined range between the minimum speed Nmin and the maximum speed Nmax (1), it is verified that the MGU control state is the voltage control mode, i.e., the fault-tolerant electric generation mode 324 (424). When the MGU control state is not the voltage control mode (0), operation of the present iteration of the control scheme 100 ends (450).

When the control state for operating the MGU 26 (424) is set to the fault-tolerant electric generation mode 324 (424)(1), the control parameters for controlling operation of the MGU 26 are set to parameters associated with the operating in the fault-tolerant electric generation mode 324 (426). Representative control parameters associated with operating in the fault-tolerant electric generation mode are described with reference to the control system 300 for controlling electric power flow to the MGU 26, shown with reference to FIG. 3. Preferably the control parameters for controlling operation of the MGU 26 include parameters for operating in the fault-tolerant electric generation mode 324, and related parameters for operating in the voltage regeneration mode 322 and the speed control mode 326. Operating in the fault tolerant electric generation mode 324 includes operating with the high-voltage energy storage system 25 disconnected with relatively low voltage initially across the high-voltage bus 31. The control parameters for controlling operation of the MGU 26 include the following:

a maximum commanded torque output from the MGU 26 when in the fault-tolerant electric generation mode 324, i.e., a maximum state for the slewed torque command (335) associated with the torque command limitation block 330;

a maximum allowable time-rate change in the commanded torque output from the MGU 26 when in the fault-tolerant electric generation mode 324, i.e., a maximum allowable time-rate change in the slewed torque command (335), associated with the torque command limitation block 330;

a maximum allowable time-rate change in the commanded direct-axis current Id (341) and commanded quadrature-axis current Iq (343) for controlling the MGU 26 in response to the slewed torque command (335) when in the fault-tolerant electric generation mode 324, associated with the motor current determination block 340;

a maximum allowable electric power generating flux, which is used to determine the magnitude of the commanded direct-axis current Id (341) and the commanded quadrature-axis current Iq (343), associated with the motor current determination block 340;

a maximum allowable time-rate change (503) in the commanded voltage across the high-voltage bus 34 when operating in the fault-tolerant electric generation mode 324, associated with the DC-link voltage regulation loop 500;

the maximum filtered measured voltage (305) across the high-voltage bus capacitor 17 when in the fault-tolerant electric generation mode 324, associated with the DC-link voltage regulation loop 500;

the commanded voltage across the high-voltage DC bus (303) when operating in the fault-tolerant electric generation mode 324; and a commanded output voltage from the APM 28 across the high-voltage bus 31.

In addition, parameters for the DC-link voltage regulation loop 500 described with reference to FIG. 5 are set and associated with operation in the fault-tolerant electric generation mode 324.

Pre-charge of the high-voltage bus capacitor 17 is enabled via the gate drive pre-charge circuits 98 (428) using electric power originating from the auxiliary battery 41 via the gate drive power module 127, as shown with reference to FIG. 2.

When monitored voltage across the high-voltage DC bus Vdc (305) achieves a minimum voltage level (430) (1), the inverter state is set to enable an electric power generation stage (432).

The commanded voltage across the high-voltage DC bus (303) is compared to monitored voltage across the high-voltage DC bus Vdc (305), i.e., the voltage across the high-voltage DC link capacitor(s) 17 indicating the voltage on the high-voltage bus 31 (434). When a difference between the commanded voltage across the high-voltage DC bus (303) and the monitored voltage across the high-voltage DC bus Vdc (305) is less than a threshold (1), the undervoltage lockout flag is enabled (436), indicating that the high-voltage bus capacitor 17 has been sufficiently charged.

The APM 28 is enabled (438). Operation of the system is thus enabled, allowing the MGU 26 to operate in the fault-tolerant electric generation mode 324, with associated current control loops and diagnostics (440). The engine 12 supplies mechanical power to the MGU 26, allowing the MGU 26 to operate in its capacity as a generator. Electrical power is thus generated by the MGU 26 and supplied via the power inverter module 27 to the APM 28 as DC power. With the engine 12 propelling the vehicle, power flow is thus provided by the APM 28 to the auxiliary battery 41, which allows the auxiliary systems 45 described with reference to FIG. 1 to remain energized.

FIG. 5 schematically shows the DC-link voltage regulation loop 500, which is a dynamically-adjustable proportional-integral controller that has speed-adjustable gains. The DC-link voltage regulation loop 500 is used to determine the regenerative torque command (307) in response to the commanded voltage across the high-voltage DC bus (303), the monitored voltage across the high-voltage DC bus Vdc (305), and the measured rotational speed (347). The monitored voltage across the high-voltage DC bus Vdc (305) is determined from the raw measurement of voltage on the high-voltage bus (117) that has been filtered using the high-voltage DC bus voltage filter 120 for the high-voltage DC bus. The high-voltage DC bus voltage filter 120 is preferably a low pass filter that has an adjustable cutoff frequency. In operation, the commanded voltage across the high-voltage DC bus (303) is filtered with a filtering device 520 that provides a filtered commanded voltage (503) that is limited to a maximum allowable time-rate change (503) in the commanded voltage across the high-voltage DC bus 34 when operating in the fault-tolerant electric generation mode 324. The time constants associated with the filtering device 520 are adjustable, and depend upon whether a high-voltage battery fault is present. A difference between the filtered commanded voltage (503) and the monitored voltage across the high-voltage DC bus Vdc (305) is determined, and is input to a gain equation 530 for calculating a commanded DC current (505) based upon the aforementioned difference and other considerations. An exemplary gain equation 530 may be as follows:

$$\frac{sKp + Ki}{s} \quad [1]$$

Kp and Ki are proportional and integral factors, respectively, which vary in relation to the measured rotational speed (347). Kp and Ki are also adjustable in relation to whether operating in the fault-tolerant electric generation mode 324.

The commanded DC current (505) is calculated, and is multiplied by the filtered commanded voltage (503) to determine a commanded power (507). The commanded power (507) is divided by the measured rotational speed (347) in 540 to determine the regenerative torque command (307), which is used by the control system 300 when operating in the fault-tolerant electric generation mode 324.

The gate drive power transferred to the upper and lower gate drive bias power supplies 35 and 135, respectively, is supplied via the gate drive pre-charge circuits 98 to charge the DC link capacitor(s) 17 to a predetermined voltage. Thus the power inverter module 27 and the gate drive circuits 98 pre-charge the DC link capacitor(s) 17, enabling magnetization of the MGU 26 via the power inverter module 27. Magnetization of the MGU 26 enables it to operate in the fault-tolerant electric generation mode 324. The pre-charge time constant is a function of resistance of each of the resistors 96, the DC link capacitor 17 and the quantity of phases of the MGU 26. A pair of the gate drive pre-charge circuits 98 associated with a single phase of the MGU 26 is shown.

FIG. 6 schematically shows an outer loop control scheme 600, which generates input parameters for elements of the control system 300 for controlling operation of the propulsion system 10 described with reference to FIGS. 1 and 2. The control scheme 300 controls operation in response to a high-voltage electrical fault that causes the high-voltage switch 40 to disconnect the energy storage system 25 from the high-voltage DC power bus 31 with continuing operation in the fault-tolerant electric generation mode 324. The outer loop control scheme 600 is a voltage control loop for determining control parameters employed in the DC-link voltage regulation loop 500 and the motor current determination block 340.

The outer loop control scheme 600 is reduced to algorithms that are iteratively executed, including periodic execution during preset loop cycles. Table 2 is provided as a key wherein the numerically labeled blocks and the corresponding functions for the outer loop control scheme 600 are set forth as follows.

TABLE 2

FIG. 6

| BLOCK | BLOCK CONTENTS |
|---|---|
| 602 | Monitor MGU speed, Vdc on high-voltage bus |
| 604 | Adjust Kp, Ki as function of MGU speed |
| 606 | Set Iq, flag = 1 if Vdc > Vov-thres<br>Reset Iq, flag = 0 if Vdc < Vov-thres-ε |
| 608 | Generate motor torque command, commanded direct-axis current Id and commanded quadrature-axis current Iq |
| 610 | Return |

The magnitude of voltage across the high-voltage bus 31 (Vdc) (305) and the rotational speed (347) of the rotor of the MGU 26 are monitored (602).

The proportional and integral factors Kp and Ki, respectively, of the gain equation 530 of the DC-link voltage regulation loop 500 are adjusted in relation to the measured rotational speed (347) of the rotor of the MGU 26 (604), thus affecting the regenerative torque command (307) generated for operation in the fault-tolerant electric generation mode 324 (604).

The monitored voltage across the high-voltage DC bus (Vdc) (305) is compared to an overvoltage threshold (Vov-thres). A flag associated with the quadrature-axis current Iq (Iq,flag) is set to a state of "1" when the monitored voltage across the high-voltage DC bus (Vdc) (305) is greater than the overvoltage threshold (Vov-thres). The flag associated with the quadrature-axis current Iq (Iq,flag) is reset to a state of "0" when the monitored voltage across the high-voltage DC bus (Vdc) (305) is less than the overvoltage threshold (Vov-thres) by an amount greater than an allowable error voltage (ε) (606).

The control system 300 uses the proportional and integral factors Kp and Ki, respectively, of the gain equation 530 of the DC-link voltage regulation loop 500 and the flag associated with the quadrature-axis current Iq (Iq,flag) to generate commands including the regenerative torque command (307), the commanded direct-axis current Id (341) and the commanded quadrature-axis current Iq (343) for controlling the MGU 26 to operate in the fault-tolerant electric generation mode 324 (608) for the present iteration of the outer loop control scheme (610).

FIG. 7 schematically shows a part of an inner loop control scheme 700, which generates input parameters for elements of the control system 300 for controlling operation of the propulsion system 10 described with reference to FIGS. 1 and 2. As previously stated, the control scheme 300 controls operation in response to a high-voltage electrical fault that causes the high-voltage switch 40 to disconnect the energy storage system 25 from the high-voltage DC power bus 31 with continuing operation in the fault-tolerant electric generation mode 324. The inner loop control scheme 300 is a current control loop for determining control parameters employed in the motor current determination block 340.

The control scheme 700 is reduced to algorithms that are iteratively executed, including periodic execution during preset loop cycles. Table 3 is provided as a key wherein the numerically labeled blocks and the corresponding functions for the inner loop control scheme 700 are set forth as follows.

TABLE 3

FIG. 7

| BLOCK | BLOCK CONTENTS |
|---|---|
| 702 | Is Iq, flag = 1? |
| 704 | Set Iq, flag = 0<br>Reset Iq loop integrator |
| 706 | Generate PWM command |
| 708 | Return |

Initially it is determined whether the flag associated with the quadrature-axis current Iq (Iq,flag) has been set to a state of "1", e.g., during execution of the outer loop control scheme 600 (702). If so, the commanded quadrature-axis current Iq (343) is set equal to zero and an associated Iq loop integrator is reset (704).

When the flag associated with the quadrature-axis current Iq (Iq,flag) is at a state of "0", the control system 300 operates using present states for the commanded direct-axis current Id (341) and the commanded quadrature-axis current Iq (343) to generate the pulsewidth duty cycle commands (393) for controlling the MGU 26.

When the flag associated with the quadrature-axis current Iq (Iq,flag) is at a state of "1", the control system 300 operates uses the present state for the commanded direct-axis current Id (341) with the commanded quadrature-axis current Iq (343) set equal to zero to generate the pulsewidth duty cycle commands (393) for controlling the MGU 26 (706) for the present iteration of the inner loop control scheme (708). As is appreciated, when the commanded quadrature-axis current Iq (343) set equal to zero, the commanded output of the MGU 26 is limited, because the quadrature-axis current Iq is directly proportional to torque output of the MGU 26.

When a high-voltage electrical fault condition occurs with the engine 12 in the engine-on state and the MGU 26 operating as an electric power generator, a limp-home mode is executed, which includes operation in the fault tolerant electric generation mode 324. During operation in the limp-home mode, the engine 12 supplies mechanical power to the MGU 26, allowing the MGU 26 to operate in its capacity as a generator. Electrical power is thus generated by the MGU 26 and supplied to the power inverter module 27, and after inversion, to the APM 28 as DC power. With the engine 12 propelling the vehicle, power flow is thus provided by the APM 28 to the auxiliary battery 41, which allows the auxiliary systems 45 described with reference to FIG. 1 to remain energized.

When a high-voltage electrical fault condition occurs with the engine 12 in the engine-off state during ongoing vehicle operation subsequent to executing the autostop control scheme, or when the MGU 26 is not generating power, the control module 5 may activate the starter motor 11 to crank the engine 12 via the auxiliary battery 41 to start the engine 12 in response to a command to control the engine 12 to the engine-on state in response to the commanded autostart control scheme.

After the engine 12 is in the engine-on state, the control module 5 signals the gate drive module 127 to transfer electrical current from the auxiliary battery 41 through the gate drive module 127 to the gate drive pre-charge circuits 98 to charge the DC link capacitor(s) 17 to a predetermined voltage. The charged DC link capacitor(s) 17 provides magnetizing current to the stator of the MGU 26 originating from the auxiliary battery 41 to operate the MGU 26 in an asynchronous mode. The engine 12 provides the necessary torque for rotating the rotor of the MGU 26.

In the fault tolerant electric generation mode 324, the power inverter module 27 controls the MGU 26 so that the MGU 26 operates in its capacity as an electric power generator, with a DC voltage that is greater than the voltage provided by the pre-charge circuits 98. The power inverter module 27 provides magnetizing current to the stator using the DC link capacitor(s) 17, and helps sustain the charge on the DC link capacitor(s) 17 using torque from the MGU 26. Once the voltage of the DC link capacitor(s) 17 exceeds the pre-charge voltage, e.g., approximately 32V or more in one exemplary embodiment, the diodes 97 in the pre-charge circuit 98 are reverse-biased and stop providing power to the DC link capacitor(s) 17.

When the MGU 26 operates as an electric power generator, including sustaining the electrical charge on the DC link capacitor(s) 17, the APM 28 may electrically charge the auxiliary battery 41.

During each of the aforementioned modes, the speed of the engine 12 may be limited to less than a predetermined level, e.g., approximately 4000 RPM or less in one exemplary embodiment, in order to control the voltage levels across the positive and negative sides of the high-voltage DC power bus 31.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including an electric motor/generator, comprising:
    determining a first torque command for the electric motor/generator responsive to an operator torque request;
    determining a regenerative torque command for the electric motor/generator responsive to a commanded voltage across a high-voltage DC bus and a monitored voltage across the high-voltage DC bus;
    determining a speed-related torque command for the electric motor/generator responsive to a commanded rotational speed for the electric motor/generator;
    upon detecting an open high-voltage switch associated with a high-voltage DC electrical bus, operating the electric motor/generator in a fault tolerant electric generation mode comprising:
        employing low-voltage electrical power to energize the high-voltage DC electrical bus;
        adjusting control parameters to operate the electric motor/generator in the fault tolerant electric generation mode;
    operating an internal combustion engine to spin the electric motor/generator; and
    operating the electric motor/generator in the fault tolerant electric generation mode responsive to the regenerative torque command; else:
    operating the electric motor/generator responsive to the speed-related torque command in response to one of a commanded speed and a preferred speed profile and a measured rotational speed of the electric motor/generator when operating responsive to a command to control rotational speed of the electric motor/generator; or
    operating the electric motor/generator responsive to the first torque command.

2. The method of claim 1, wherein employing low-voltage electrical power to energize the high-voltage DC electrical bus comprises transferring electrical power originating from a low-voltage battery across pre-charge circuits to electrically charge a DC link capacitor electrically connected across the high-voltage DC electrical bus.

3. The method of claim 1, wherein employing low-voltage electrical power to energize the high-voltage DC electrical bus comprises transferring electric power originating from a low-voltage battery to energize the high-voltage DC electrical bus.

4. The method of claim 3, wherein transferring electric power originating from the low-voltage battery to energize the high-voltage DC electrical bus comprises transferring electric power originating from the low-voltage battery across pre-charge circuits to energize the high-voltage DC electrical bus.

5. The method of claim 1, wherein operating the electric motor/generator unit in the fault tolerant electric generation mode comprises operating the electric motor/generator unit to only generate electric power and not operating the electric motor/generator unit to generate torque.

6. The method of claim 1, wherein the commanded power is determined in response to a commanded voltage across the high-voltage DC electrical bus and a monitored voltage across the high-voltage DC electrical bus.

7. The method of claim 1, wherein adjusting control parameters to operate the electric motor/generator unit in the fault tolerant electric generation mode comprises adjusting maximum allowable time-rate changes in commanded direct and quadrature-axis currents associated with controlling the electric motor/generator unit.

8. The method of claim 7, wherein adjusting the maximum allowable time-rate changes in commanded direct and quadrature-axis currents associated with controlling the electric motor/generator unit comprises increasing the maximum allowable time-rate changes in the commanded direct and quadrature-axis currents when operating in the fault-tolerant electric generation mode.

9. The method of claim 1, further comprising operating the internal combustion engine to generate tractive torque output from the powertrain system.

10. The method of claim 1, further comprising operating the electric motor/generator responsive to the regenerative torque command when there is a command to operate the electric motor/generator in an electric power generation mode to charge a high-voltage energy storage system electrically connected to the high-voltage bus.

11. A method for operating a powertrain system including an electric motor/generator, comprising:
    determining a first torque command for the electric motor/generator responsive to an operator torque request;
    determining a regenerative torque command for the electric motor/generator responsive to a commanded voltage across a high-voltage DC bus and a monitored voltage across the high-voltage DC bus;
    determining a speed-related torque command for the electric motor/generator responsive to a commanded rotational speed for the electric motor/generator;
    upon detecting a fault associated with a high-voltage DC electrical bus resulting in disconnection of the high-voltage DC electrical bus from a high-voltage energy storage system, operating the electric motor/generator in a fault tolerant electric generation mode comprising:
        employing low-voltage electrical power to energize the high-voltage DC electrical bus;
        adjusting control parameters to effect operation of the electric motor/generator in the fault-tolerant electric generation mode;

imposing limitations on the regenerative torque command, said limitations comprising a first torque limit associated with torque generating capability of the electric motor/generator, a second torque associated with closed-loop power control and a third torque limit associated with closed-loop voltage control;

operating an internal combustion engine to transfer torque to the electric motor/generator unit and to generate tractive torque output from the powertrain system; and operating the electric motor/generator in the fault-tolerant electric generation mode responsive to the regenerative torque command and the imposed limitations; else:

operating the electric motor/generator responsive to the speed-related torque command in response to one of a commanded speed and a preferred speed profile and a measured rotational speed of the electric motor/generator when operating responsive to a command to control rotational speed of the electric motor/generator; or operating the electric motor/generator responsive to the first torque command.

12. The method of claim 11, wherein employing low-voltage electrical power to energize the high-voltage DC electrical bus comprises transferring electrical power originating from a low-voltage battery across pre-charge circuits to electrically charge a capacitor electrically connected across the high-voltage DC electrical bus.

13. The method of claim 11, wherein employing low-voltage electrical power to energize the high-voltage DC electrical bus comprises transferring electric power originating from a low-voltage battery to energize the high-voltage DC electrical bus.

14. The method of claim 13, wherein transferring electric power originating from the low-voltage battery to energize the high-voltage DC electrical bus comprises transferring electric power originating from the low-voltage battery across pre-charge circuits to energize the high-voltage DC electrical bus.

15. The method of claim 11, wherein operating the electric motor/generator unit in the fault tolerant electric generation mode comprises operating the electric motor/generator unit to only generate electric power and not operating the electric motor/generator unit to generate torque.

16. The method of claim 11, wherein the commanded power is determined in response to a commanded voltage across the high-voltage DC electrical bus and a monitored voltage across the high-voltage DC electrical bus.

17. The method of claim 11, wherein adjusting control parameters to operate the electric motor/generator unit in the fault tolerant electric generation mode comprises adjusting maximum allowable time-rate changes in commanded direct and quadrature-axis currents associated with controlling the electric motor/generator unit.

18. The method of claim 17, wherein adjusting the maximum allowable time-rate changes in commanded direct and quadrature-axis currents associated with controlling the electric motor/generator unit comprises increasing the maximum allowable time-rate changes in the commanded direct and quadrature-axis currents when operating in the fault-tolerant electric generation mode.

19. A method for operating a powertrain system including an internal combustion engine and an electric machine, comprising:

determining a first torque command for the electric machine responsive to an operator torque request;

determining a regenerative torque command for the electric machine responsive to a commanded voltage across a high-voltage DC bus and a monitored voltage across the high-voltage DC bus;

determining a speed-related torque command for the electric machine responsive to a commanded rotational speed for the electric machine;

upon opening a high-voltage switch of a high-voltage DC electrical bus electrically connected between a power inverter module and the electric machine, operating the electric machine in a fault tolerant electric generation mode comprising:

disabling gate drive pulses to an inverter electrically coupled to the electric machine;

employing a low-voltage battery to energize a high-voltage bus capacitor of the high-voltage DC electrical bus;

adjusting control parameters to operate the electric machine in a fault-tolerant electric generation mode, comprising determining a regenerative torque command comprising a commanded power divided by rotational speed of the electric motor/generator;

starting the internal combustion engine to spin the electric machine; and upon the electric machine achieving a predetermined rotational speed: activating the inverter module;

operating the electric machine in the fault-tolerant electric generation mode when the high-voltage bus capacitor achieves a predetermined voltage level responsive to the regenerative torque command; and controlling an auxiliary power module to electrically charge the low-voltage battery; else:

operating the electric machine responsive to the speed-related torque command in response to one of a commanded speed and a preferred speed profile and a measured rotational speed of the electric machine when operating responsive to a command to control rotational speed of the electric machine; or operating the electric machine responsive to the first torque command.

20. The method of claim 19, wherein the predetermined voltage level comprises a voltage level sufficient to magnetize a stator of the electric machine.

* * * * *